United States Patent [19]
Miyamaru et al.

[11] Patent Number: 5,259,972
[45] Date of Patent: Nov. 9, 1993

[54] APPARATUS AND METHOD FOR PURIFYING WATER

[75] Inventors: Hitoshi Miyamaru, Sagamihara; Takaaki Fukumoto; Motonori Yanagi, both of Itami, all of Japan

[73] Assignees: Nippon Rensui Company; Mitsubishi Denki Kabushiki Kaisha, Tokyo, Japan

[21] Appl. No.: 738,129

[22] Filed: Jul. 30, 1991

[30] Foreign Application Priority Data

Aug. 1, 1990 [JP] Japan .................... 2-206174

[51] Int. Cl.⁵ .............................. B01D 61/00
[52] U.S. Cl. ............................ 210/652; 210/654; 210/655; 210/661; 210/681; 210/760; 210/900; 210/195.2; 210/257.2
[58] Field of Search ............ 210/649, 652, 654, 655, 210/661, 658, 760, 195.2, 202, 181, 257.2, 196, 758, 759, 760, 738, 202, 900, 663, 681

[56] References Cited

U.S. PATENT DOCUMENTS

| | | | |
|---|---|---|---|
| 3,779,909 | 12/1973 | Wisfeld et al. | 210/760 |
| 4,136,027 | 1/1979 | Sakamoto et al. | 210/760 |
| 4,273,660 | 6/1981 | Beitzel | 210/760 |
| 4,280,912 | 7/1981 | Berry, III et al. | 210/266 |
| 4,548,716 | 10/1985 | Boeve | 210/760 |
| 4,595,498 | 6/1986 | Cohen et al. | 210/196 |
| 4,724,079 | 2/1988 | Sale et al. | 210/652 |
| 4,759,844 | 7/1988 | Lipschultz | 210/257.2 |
| 4,969,991 | 11/1990 | Valadez | 210/195.2 |
| 5,059,317 | 10/1991 | Marius et al. | 210/259 |

FOREIGN PATENT DOCUMENTS

| | | |
|---|---|---|
| 81112882 | 12/1982 | Fed. Rep. of Germany . |
| 63-36899 | 2/1988 | Japan . |
| 63-59388 | 2/1988 | Japan . |

Primary Examiner—Robert A. Dawson
Assistant Examiner—Ana M. Fortuna
Attorney, Agent, or Firm—Leydig, Voit & Mayer

[57] ABSTRACT

In an apparatus and method for purifying water, an oxidation forcibly turns colloidal substances into fine particles of oxides, thus increasing the size of the particles. The effluent of oxidation process is treated by ion exchange process, and then treated by membrane process. Because of the increased size of the particles, they are easily removed in the subsequent ion exchange process. The membrane process is thereby prevented from clogging up, and then removes fine particles that cannot be removed by the ion exchange process. Colloidal substances are thus removed effectively from raw water.

9 Claims, 4 Drawing Sheets

APPARATUS AND METHOD FOR PURIFYING WATER

BACKGROUND OF THE INVENTION

1. FIELD OF THE INVENTION

The present invention relates to an apparatus and method for purifying water and, more particularly, to an apparatus and method for producing ultrapure water used as rinsing water for VLSIs and the like.

2. DESCRIPTION OF THE RELATED ART

A large quantity of pure water or ultrapure water is employed in the electronic industry. As the degree of integration of LSIs increases, there is an ever increasing demand for high purity of ultrapure water. An ion exchange unit, an ultraviolet sterilizer, a cartridge filter, a reverse osmosis unit (hereinafter referred to as an RO), an ultrafilter membrane, and other components have been heretofore combined together in a multiple-stage structure so as to produce ultrapure water.

FIG. 4 is a flowchart showing steps in which water is treated by a conventional water purifying apparatus. Raw water is received in a raw water tank 1, and then suspended solids in the raw water are removed by a coagulation filter 2. A coagulant such as polyaluminum chloride is added to the raw water. The raw water treated by the coagulation filter 2 is then stored in a filtered water tank 3. Thereafter, a so-called two-bed three-tower type ion exchange unit, composed of a cation exchange tower 4, a decarbonating tower 5, and an anion exchange tower 6, removes ions from the filtered water. The cation exchange tower 4 as well as the anion exchange tower 6 also removes fine particles and organic substances from the water. The water treated by the anion exchange tower 6 is stored temporarily in a treated water tank 7, and then passed through a heat exchanger 8, an ultraviolet sterilizer 9, and a safety filter 10 before it is fed to a RO 11. The water is treated by the RO 11 and is stored in an RO treated water tank 12. A mixed bed ion exchange unit 13 then removes residual ions in the water, thus rendering the resistivity of water to $10M\Omega\cdot cm$ or more. The water is supplied to a point of use or transferred to a polishing system to produce ultrapure water.

The conventional water purifying apparatus is configured as described above. The RO 11 is a membrane having pore size of several angstrom, and removes ions, fine particles, fungi, high-molecular organic substances, and colloidal substances such as colloidal silica, all of which are in water. The RO 11 is made of a thin membrane and is operated under a high pressure of 10-30 $Kg/cm^2$. Therefore, some of the above substances pass through the RO 11, thus reducing the removal ratio of colloidal substances in particular.

Recently, colloidal substances, such as colloidal silica, colloidal metal, and colloidal organic substances, have become the most serious problem when producing high purity rinsing water for VLSIs and ULSIs. The thus-constructed conventional water purifying apparatus has difficulty in removing the colloidal substances in water.

SUMMARY OF THE INVENTION

The present invention has been made to solve such problems. Accordingly, the object of the invention is to provide an apparatus and method for purifying water which are capable of effectively removing colloidal substances that cannot be removed by a RO or the other membranes.

In order to achieve the above object, according to one aspect of the present invention, a water purifying system is provided, and the system comprises: a first ion exchange unit which removes fine particles and organic substances from raw water; an oxidation unit located downstream from said ion exchange unit which converts colloidal substances in raw water into solid fine particles of oxides and oxidizes low-molecular organic substances into organic acids and carbonic acid; a second ion exchange unit which removes fine particles and organic substances from effluent output from said oxidation unit; an activated carbon tower connected in series between said oxidation unit and said second ion exchange unit which removes ozone from the effluent output from said oxidation unit; and a reverse osmosis membrane unit located downstream from said second ion exchange unit, which removes fine particle and organic substances from effluent output from said second ion exchange unit; whereby nonvolatile residue in effluent output from said reverse osmosis membrane is less than or equal to 10 ppb.

According to another aspect of this invention, a water purifying method is provided, and the method comprises providing a source of water; converting colloidal substances present in the water into solid fine particles of oxides by mixing the water with ozone in an oxidation unit; decomposing the ozone by passing water through an activated carbon tower; removing fine particles and decomposed organic and carbonic acids from the water by passing the water through a mixed bed ion exchange unit; and filtering the water output from the mixed bed ion exchanger to remove remaining fine particles and molecular organic substances not oxidized in said converting step by passing the water though a reverse osmosis membrane; thereby providing water having less than or equal to 10 ppb's of nonvolatile residue.

DESCRIPTION OF THE PREFERRED EMBODIMENTS

Figure 1:
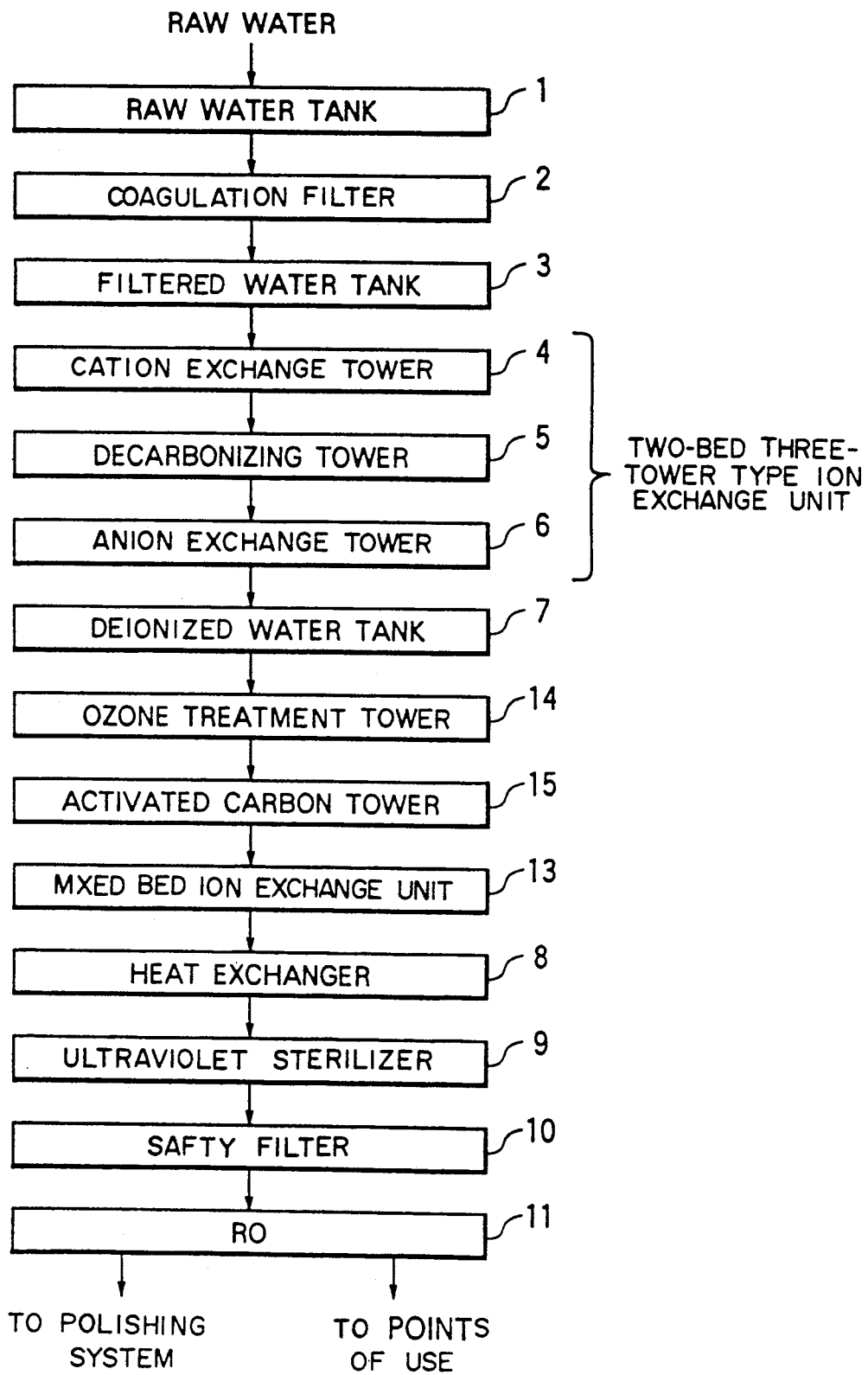
FIG. 1 is a flowchart showing steps in which water is treated by a water purifying apparatus in accordance with an embodiment of the present invention.

FIG. 1 is a flowchart showing steps in which water is treated by a water purifying apparatus in accordance with an embodiment of the present invention. Components or steps denoted by numerals 1 through 13 in FIG. 1 are the same components or steps as those described in the conventional water purifying apparatus. Water treated by an anion exchange tower 6 is stored in a deionized water tank 7, and is then introduced into an ozone treatment tower 14 for oxidation. The problem with the conventional water purifying apparatus is that some colloidal substances in water even pass through an RO 11 having the smallest pore size. For this reason, the ozone treatment tower 14, used for the oxidation, is provided so as to not only forcibly turn the colloidal substances into solid fine particles of oxides, but also oxidize low-molecular organic substances into organic acids and carbonic acid.

Figure 2:
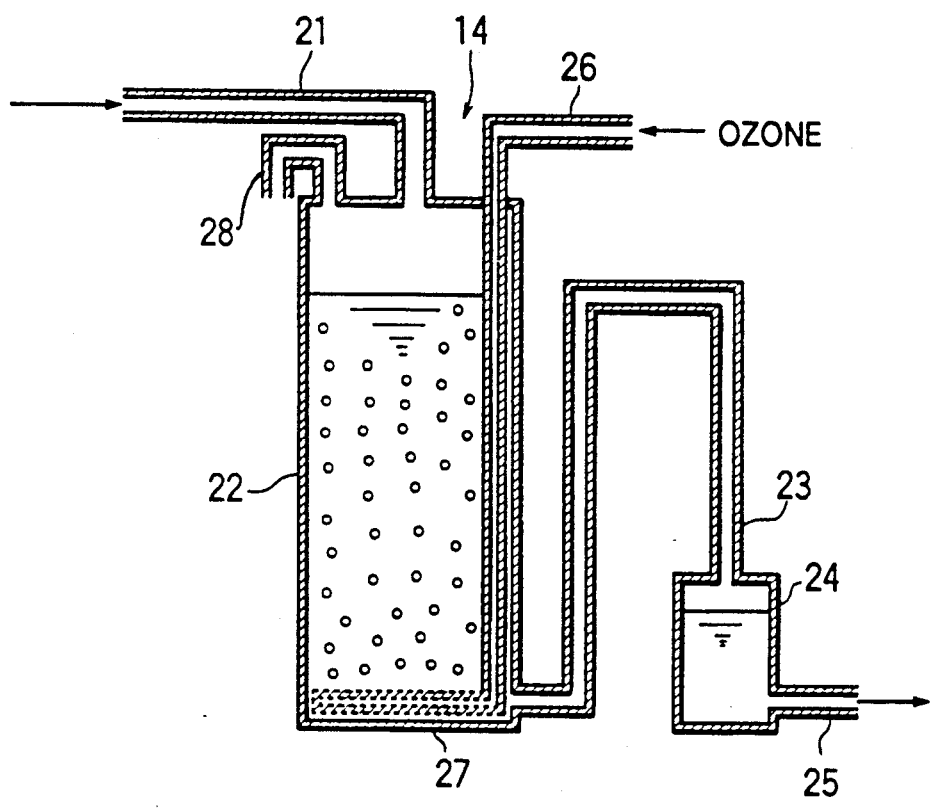
FIG. 2 is a schematic cross-sectional view of an ozone treatment tower.

FIG. 2 is a schematic cross-sectional view of an ozone treatment tower. Water to be treated is fed through a water inlet pipe 21 into a reaction tank 22. Ozone produced by an ozonizer (not shown) is introduced into the reaction tank 22 through an ozone feed pipe 26, and is then bubbled by an ozone distributing pipe 27 connected to the end of the ozone feed pipe 26. The water which has been forcibly oxidized by ozone passes through a reaction tank outlet pipe 23 and is stored in an ozone treated water tank 24 before it discharges through an ozone-treated water outlet 25. Ozone not yet reacted discharges outside the system through an ozone discharging pipe 28. During the ozone treatment, hydrogen peroxide may be added into the reaction tank 22, thereby further oxidizing the colloidal substances, improving the capability of such a process.

Because ozone is dissolved in water which has been ozone-oxidized, if the water passes directly to a mixed bed ion exchange unit 13, ion exchange resins may be deteriorated by oxidation. For this reason, the water is introduced to the mixed bed ion exchange unit 13 after either an activated carbon tower 15 to decompose ozone, or a reduction reagent such as NaHSO$_3$ is used to remove ozone. The ozone treatment turns the colloidal substances into the oxidized, solid fine particles, thus increasing the number of the fine particles clogging up the RO 11. The mixed bed ion exchange unit 13 is inserted into this step of the treatment because it prevents the RO 11 from clogging up. After the mixed bed ion exchange unit 13 has removed the fine particles, the treated water is supplied to the RO 11. Since the mixed bed ion exchange unit 13 also removes organic acids and carbonic acid decomposed by the ozone treatment, the total organic carbon in the water is reduced.

The water treated by the mixed bed ion exchange unit 13 then passes through a heat exchanger 8 and other components, and is treated by the RO 11. Because ozone is employed in the preceding step, a reverse osmosis membrane resistant to oxidation, preferably that made of aromatic polyamide resin or cellulose acetate resin, is used as the RO 11 to prevent it from deteriorating because of oxidation over extended periods of time. The RO 11 removes the solid fine particles of oxides that have not been removed by the mixed bed ion exchange unit 13 as well as relatively high-molecular organic substances that have not been oxidized by the ozone treatment.

The following table shows the quality of pure water obtained by the water purifying apparatus in accordance with this invention.

TABLE

| | | Inlet of mixed bed ion exchange unit | | Outlet of RO | |
|---|---|---|---|---|---|
| | With or without ozone reaction tank | Fine particles ($\geq 0.07\ \mu m$) (particles/ml) | Nonvolatile residue (ppb) | Fine particles ($\geq 0.07\ \mu m$) (particles/ml) | Nonvolatile residue (ppb) |
| Example Compared | Without | 26,000 | 1,000 | 65 | 100 |
| Embodiment | With | 51,000 | 1,000 | 68 | 10 |

When the ozone treatment is conducted, the fine particles, each having a size of 0.07 $\mu$m or more, in the water at the inlet of the mixed bed ion exchange unit approximately doubles from 26,000 to 51,000 particles per mililiter. Nonvolatile residue, on the other hand, remains the same, 1,000 ppb. This leads us to believe that the ozone treatment has made the colloidal substances into the solid fine particles of oxides. The nonvolatile residue serves as an index of the quantity of the colloidal substances, indicating the total amount of the colloidal substances and the fine particles. Nonvolatile residue in the water at the outlet of the RO decreases by one tenth from 100 ppb to 10 ppb. The colloidal substances reduces drastically, and the water ten times as pure as that produced by the conventional apparatus and method is obtainable.

Figure 3:
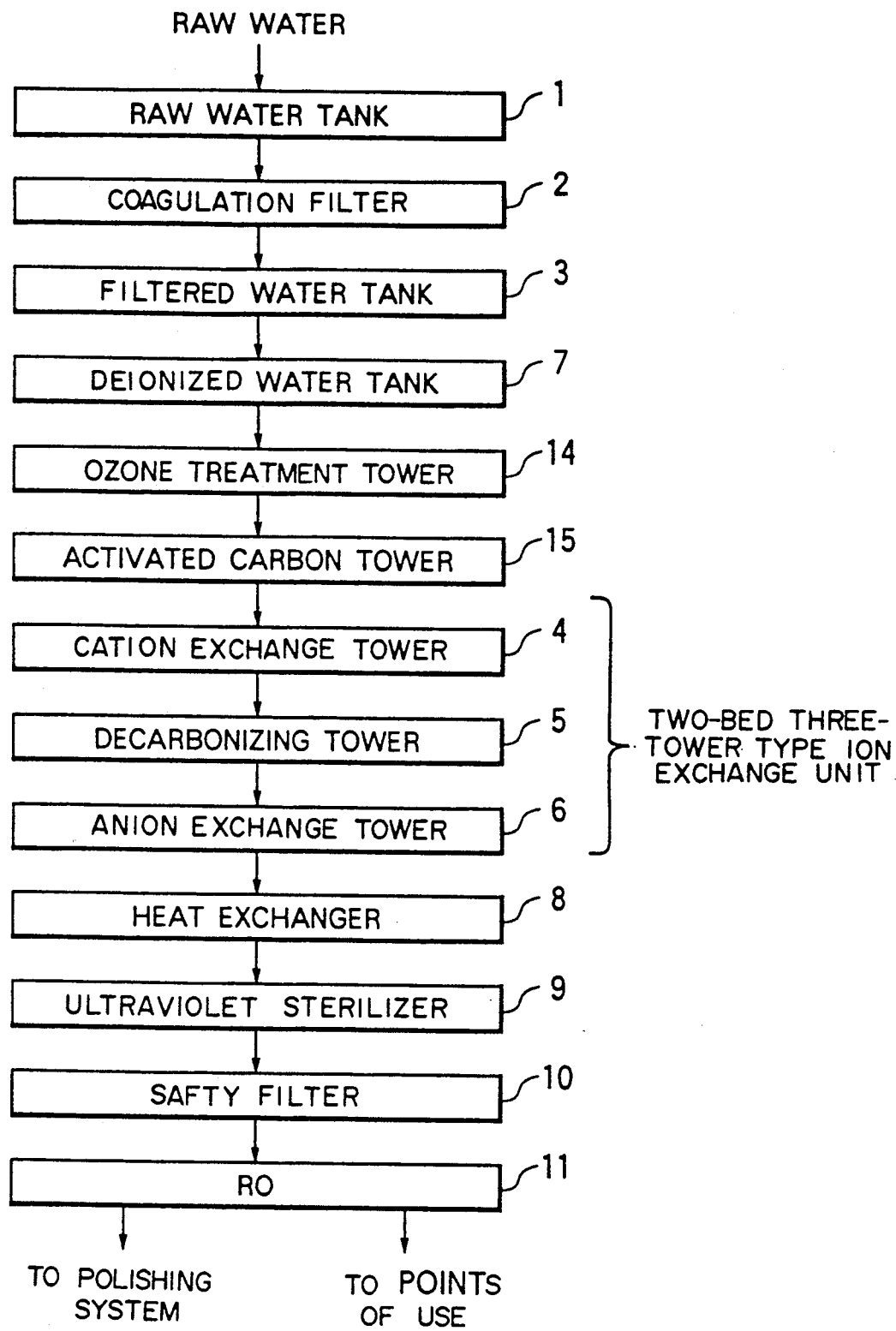
FIG. 3 is a flowchart showing steps in which water is treated by the water purifying apparatus according to another embodiment of this invention.
Figure 4:
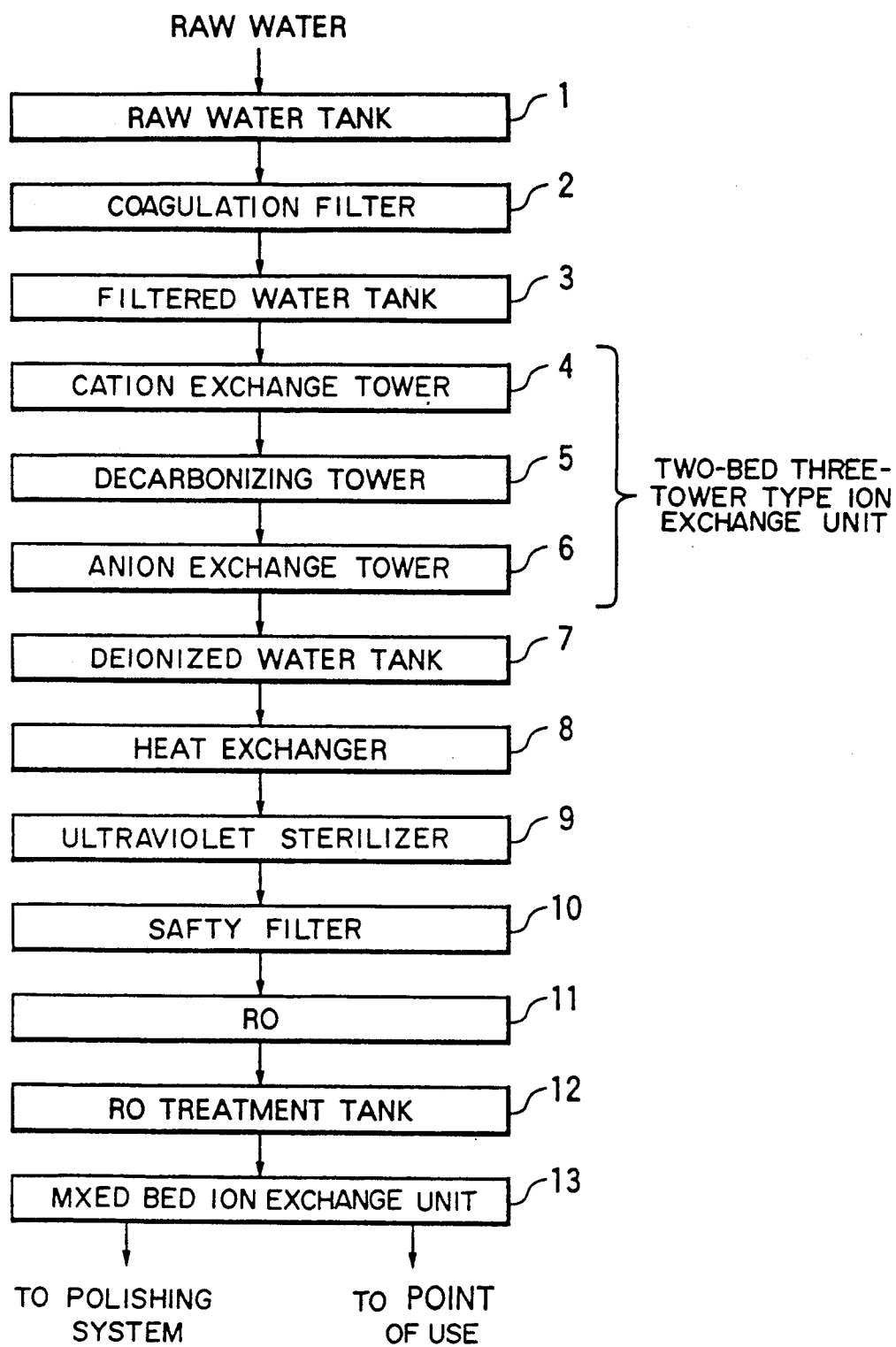
FIG. 4 is a flowchart showing steps in which water is treated by the conventional water purifying apparatus.

In the embodiment described above, the ozone treatment tower, the mixed bed ion exchange unit, and the RO are all installed where water is fed after it has been treated by two-bed three-tower type ion exchange unit. However, the ion exchange unit may also be installed anywhere, for example, where the water is fed after it has been treated by the activated carbon tower 15, as shown in FIG. 3. Instead of the mixed bed ion exchange unit, two-bed three-tower type ion exchange unit may also be used. These two types of ion exchange units may also be used together. An additional anion exchange tower may be used.

What is claimed is:

1. A system for purifying water comprising:
   a first ion exchange unit which removes fine particles and organic substances from raw water;
   an oxidation unit located downstream from said ion exchange unit which converts colloidal substances in raw water into solid fine particles of oxides and oxidizes low-molecular organic substances into organic acids and carbonic acid;
   a second ion exchange unit which removes fine particles and organic substances from effluent output from said oxidation unit;
   an activated carbon tower connected in series between said oxidation unit and said second ion exchange unit which removes ozone from the effluent output from said oxidation unit; and
   a reverse osmosis membrane unit located downstream form said second ion exchange unit, which removes fine particles and organic substances from effluent output from said second ion exchange unit;
   whereby nonvolatile residue in effluent output from said reverse osmosis membrane is less than or equal to 10 ppb.

2. A system as claimed in claim 1 wherein the oxidation unit is an ozone treatment unit.

3. A system as claimed in claim 1 wherein said first ion exchange unit is a two-bed three-tower type ion exchanger.

4. A system as claimed in claim 1 wherein said second ion exchange unit is a two-bed three-tower type ion exchanger.

5. A system as claimed in claim 1 wherein the reverse osmosis membrane is an oxidation resistant membrane.

6. A system as claimed in claim 1 wherein the membrane is a membrane made of a resin selected from the group consisting of aromatic polyamide resin and cellulose acetate resin.

7. A system as claimed in claim 1 wherein said second ion exchange unit is a mixed bed ion exchanger.

8. A method of purifying water comprising the steps providing a source of water;
converting colloidal substances present in the water into solid fine particles of oxides by mixing the water with ozone in an oxidation unit;
decomposing the ozone by passing the water through an activated carbon tower;
removing fine particles and decomposed organic and carbonic acids from the water by passing the water through a mixed ben ion exchanger unit; and
filtering the water output from the mixed bed ion exchange unit to remove remaining fine particles and molecular organic substances not oxidized in said converting step by passing the water through a reverse osmosis membrane;
thereby providing water having less than or equal to 10 ppb's of nonvolatile residue.

9. A method of purifying water as claimed in claim 8 wherein the step of converting colloidal substances includes adding hydrogen peroxide to the water to further oxidize the colloidal substances.

* * * * *

UNITED STATES PATENT AND TRADEMARK OFFICE
CERTIFICATE OF CORRECTION

PATENT NO. : 5,259,972
DATED : November 9, 1993
INVENTOR(S) :
  Miyamaru et al.

It is certified that error appears in the above-indentified patent and that said Letters Patent is hereby corrected as shown below:

Claim 1, column 4, line 46, change "form" to --from--.

Signed and Sealed this

Third Day of May, 1994

Attest:

BRUCE LEHMAN

*Attesting Officer*         *Commissioner of Patents and Trademarks*